United States Patent
Lee et al.

(10) Patent No.: US 9,317,184 B2
(45) Date of Patent: Apr. 19, 2016

(54) PROVIDING A CONFIGURABLE MENU OF HIERARCHICAL MENU ITEMS

(71) Applicant: Verizon New Jersey Inc., Newark, NJ (US)

(72) Inventors: Woo Beum Lee, Basking Ridge, NJ (US); Jeffrey M. Walsh, Verona, NJ (US)

(73) Assignee: Verizon New Jersey Inc., Newark, NJ (US)

( * ) Notice: Subject to any disclaimer, the term of this patent is extended or adjusted under 35 U.S.C. 154(b) by 175 days.

(21) Appl. No.: 14/135,839

(22) Filed: Dec. 20, 2013

(65) Prior Publication Data

US 2015/0177919 A1    Jun. 25, 2015

(51) Int. Cl.
| | |
|---|---|
| *G06F 15/00* | (2006.01) |
| *G06F 13/00* | (2006.01) |
| *G06F 3/0482* | (2013.01) |
| *G06F 3/0485* | (2013.01) |
| *G06F 3/0488* | (2013.01) |

(52) U.S. Cl.
CPC ............ *G06F 3/0482* (2013.01); *G06F 3/0485* (2013.01); *G06F 3/0488* (2013.01)

(58) Field of Classification Search
CPC   G06F 3/04847; G06F 3/04886; G06F 3/0482

USPC .................. 715/763–765, 740–743, 851–853
See application file for complete search history.

(56) References Cited

U.S. PATENT DOCUMENTS

| | | | | |
|---|---|---|---|---|
| 2005/0081164 | A1* | 4/2005 | Hama et al. .................... | 715/830 |
| 2005/0108657 | A1* | 5/2005 | Han ............................. | 715/827 |
| 2012/0226982 | A1* | 9/2012 | Nakanishi et al. ............ | 715/719 |
| 2013/0219340 | A1* | 8/2013 | Linge ........................... | 715/834 |
| 2014/0298268 | A1* | 10/2014 | Kang et al. .................... | 715/841 |

* cited by examiner

*Primary Examiner* — Kevin Nguyen

(57) ABSTRACT

A device may extract menu information associated with a first application. The menu information may identify hierarchical menu items corresponding to at least two levels of a menu hierarchy associated with a first menu of the first application. The device may receive configuration information that controls a manner in which the hierarchical menu items are to be provided for display. The device may execute the first application to cause first information, associated with the first application, to be provided for display. The device may execute a second application that provides the hierarchical menu items for display. The second application may be different from the first application. The device may provide the hierarchical menu items for display concurrently, via a second menu overlaid on the first information associated with the first application, based on the configuration information and further based on executing the second application.

20 Claims, 10 Drawing Sheets

PROVIDING A CONFIGURABLE MENU OF HIERARCHICAL MENU ITEMS

BACKGROUND

Many software applications use menus to present a list of options and/or commands to a user of a computing device. The user may interact with a menu item, included in the menu, to select an option to be applied and/or a command to be executed by the computing device.

DETAILED DESCRIPTION OF PREFERRED EMBODIMENTS

The following detailed description of example implementations refers to the accompanying drawings. The same reference numbers in different drawings may identify the same or similar elements.

A software application, executing on a user device, may provide a menu that includes menu items relating to options and/or commands that may be selected (e.g., by a user) to control a manner in which the software application behaves. Many menus are provided in a hierarchical manner, which may require the user to navigate through several levels of a hierarchy of menu items before reaching a menu item that the user desires to select. This may be confusing, frustrating, and inefficient for the user. Implementations described herein provide a user-friendly mechanism for presenting hierarchical menu items without requiring a user to perform extensive navigation of a menu.

Figure 1:
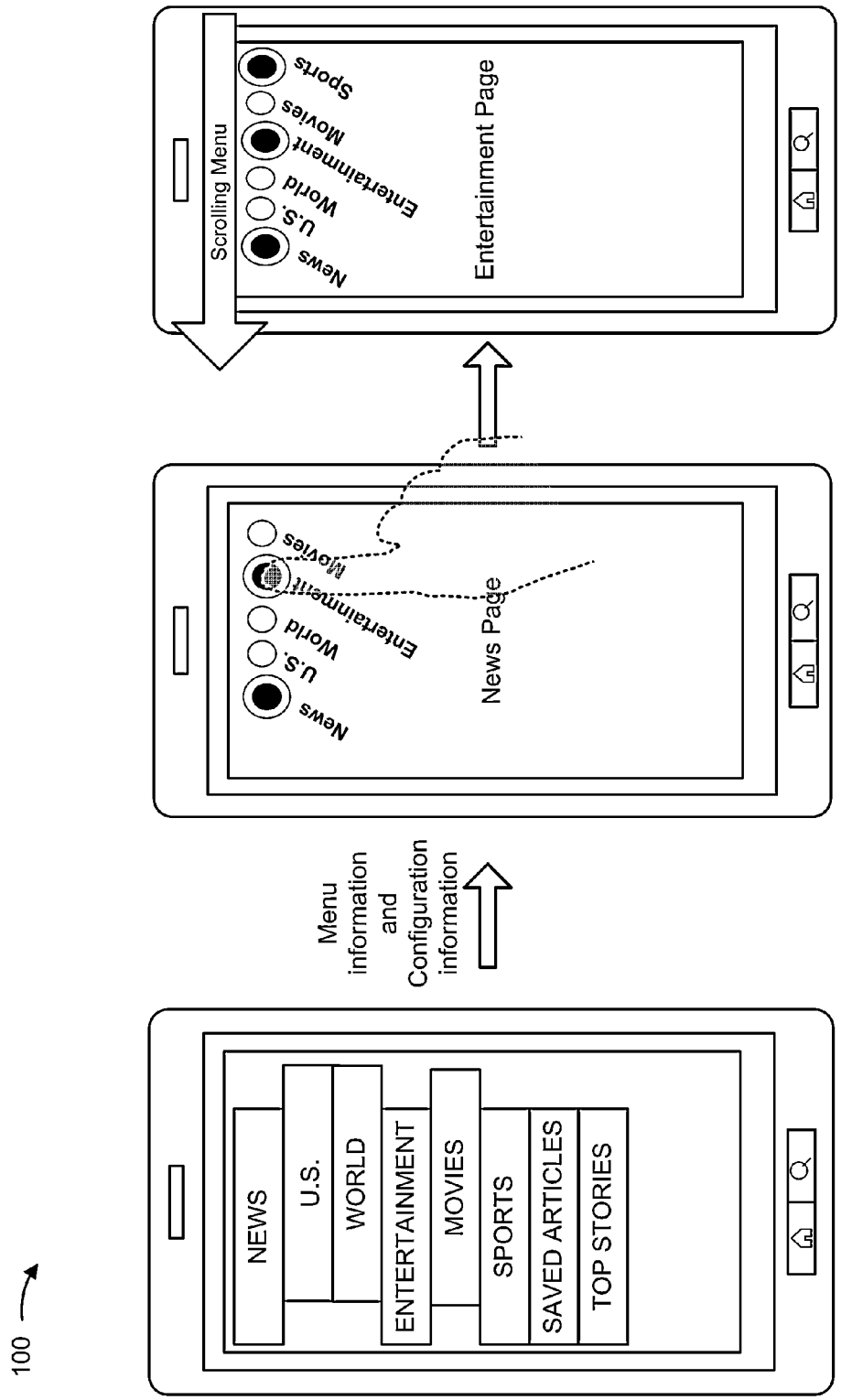
FIG. 1 is a diagram of an overview of an example implementation described herein.

FIG. 1 is a diagram of an overview of an example implementation 100 described herein. As shown in FIG. 1, a software application, executing on a user device, may provide a menu for display. As an example, the software application may include a news application, and user selection of a menu item may cause news stories, associated with the selected menu item (e.g., a news section) to be provided for display. As shown, the menu may be hierarchical. For example, a menu item for a "News" section may be associated with sub-sections of "U.S. News" and "World News."

As further shown in FIG. 1, a menu application, executing on the user device, may extract menu information that identifies a hierarchy of menu items associated with the news application. The menu application may also receive configuration information, such as configuration information input by a user to control a manner in which the hierarchy of menu items is presented by the menu application. The user device, executing the menu application, may use the menu information and the configuration information to present a hierarchy of menu items, as shown. For example, a first level of the hierarchy (e.g., "News") may be shown using a first size, a first color, etc., and a second level of the hierarchy (e.g., "U.S. News," "World News") may be shown using a second size, a second color, etc. In some implementations, the hierarchy of menu items may scroll across a display of the user device. As shown, a user may interact with a menu item, which may cause information associated with the menu item (e.g., "Entertainment") to be provided for display on the user device. In this way, the menu application executing on user device 210 provides a user-friendly mechanism for presenting hierarchical menu items without requiring a user to perform extensive navigation of a menu.

Figure 2:
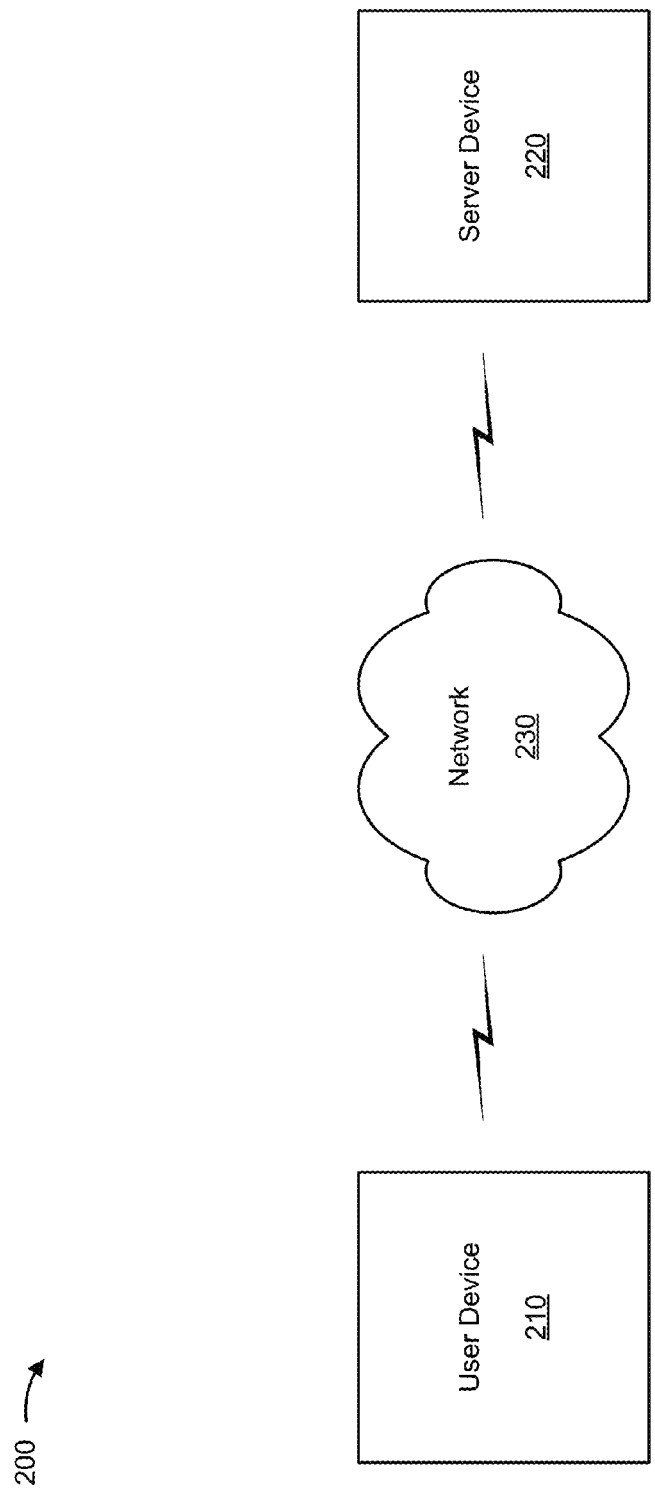
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a server device 220, and a network 230. Devices of environment 200 may interconnect via wired connections, wireless connections, or a combination of wired and wireless connections.

User device 210 may include one or more devices capable of receiving, generating, storing, processing, and/or providing information associated with a software application executing on user device 210, such as a menu application and/or another application. For example, user device 210 may include a computing device, such as a laptop computer, a tablet computer, a mobile phone (e.g., a smart phone, a radiotelephone, etc.), a desktop computer, or a similar device. In some implementations, client device 210 may receive information from and/or transmit information to server device 220 (e.g., menu information, configuration information, content associated with a software application, etc.).

Server device 220 may include one or more devices capable of receiving, generating, storing, processing, and/or providing information associated with a software application executing on user device 210. For example, server device 230 may include a computing device, such as a server (e.g., a web server, a content server, a cloud storage server, etc.), a desktop computer, a laptop computer, a tablet computer, or a similar device.

Network 230 may include one or more wired and/or wireless networks. For example, network 230 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
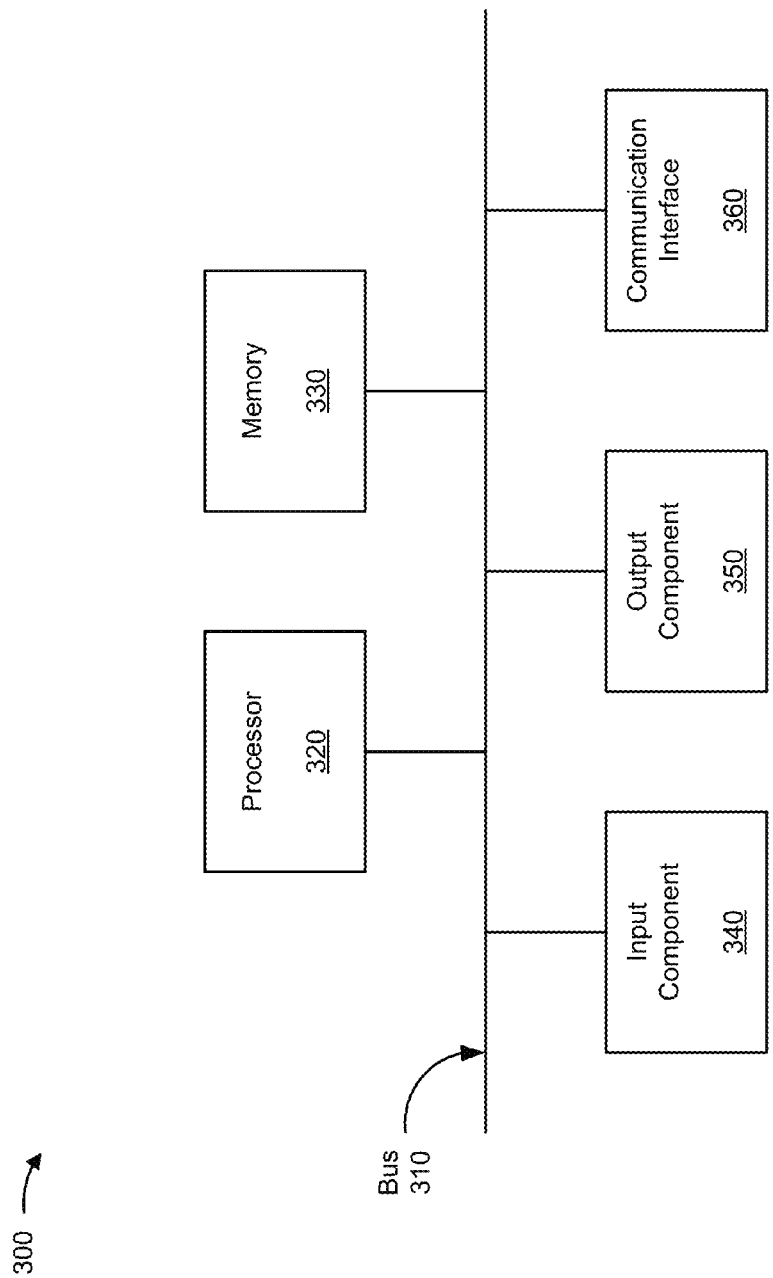
FIG. 3 is a diagram of example components of one or more devices of FIG. 2.

FIG. 3 is a diagram of example components of a device 300. Device 300 may correspond to user device 210 and/or server device 220. In some implementations, each of user device 210 and/or server device 220 may include one or more devices 300 and/or one or more components of device 300. As shown in FIG. 3, device 300 may include a bus 310, a processor 320, a memory 330, an input component 340, an output component 350, and a communication interface 360.

Bus 310 may include a component that permits communication among the components of device 300. Processor 320 may include a processor (e.g., a central processing unit, a graphics processing unit, an accelerated processing unit), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions included in a computer-readable medium, such as memory 330. A computer-readable medium is defined herein as a non-transitory memory device. A memory device includes memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, one or more of the components of device 300 may perform one or more functions described as being performed by another one or more components of device 300.

Figure 4:
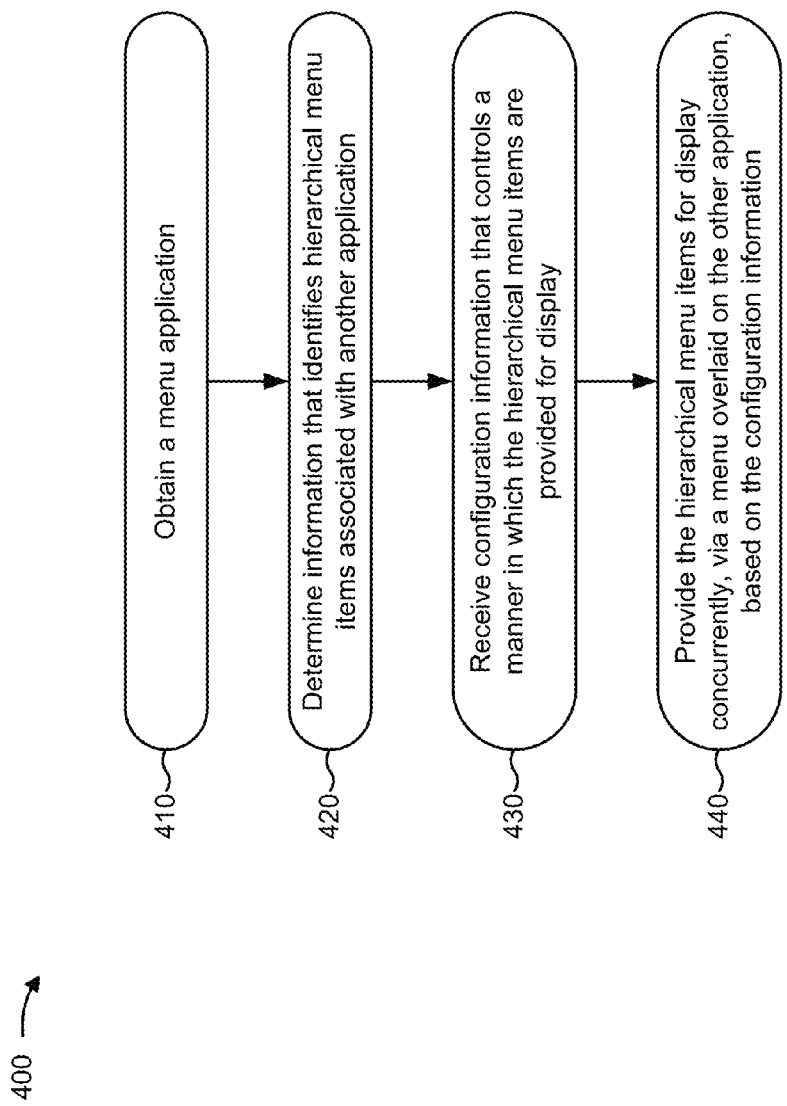
FIG. 4 is a flow chart of an example process for providing a configurable menu of hierarchical menu items.

FIG. 4 is a flow chart of an example process 400 for providing a configurable menu of hierarchical menu items. In some implementations, one or more process blocks of FIG. 4 may be performed by user device 210. Additionally, or alternatively, one or more process blocks of FIG. 4 may be performed by another device or a group of devices separate from or including user device 210, such as server device 220.

As shown in FIG. 4, process 400 may include obtaining a menu application (block 410). For example, user device 210 may obtain the menu application (e.g., from server device 220) based on user input that causes user device 210 to obtain the menu application. For example, the user may identify the menu application using an application store (e.g., accessible via user device 210) that provides information regarding applications that may be obtained by user device 210. The user may select the menu application from the application store. Based on the user selection, user device 210 may obtain the menu application, may install the menu application, and/or or and may store the menu application in a memory associated with user device 210.

As further shown in FIG. 4, process 400 may include determining menu information that identifies hierarchical menu items associated with another application (block 420). For example, user device 210 may determine menu information that identifies hierarchical menu items associated with a software application, other than the menu application, that is stored by user device 210. The software application may include, for example, a news application that provides news stories for display, a productivity application (e.g., a word processing application, a spreadsheet application, etc.), and/or another type of application that includes a menu and/or hierarchical menu items. The other application may provide application information for display on user device 210, such as content, images, text, videos, etc.

A menu may refer to a representation of a set of options and/or commands presented on user device 210. The menu may include one or more menu items corresponding to an option and/or a command. When user device 210 detects an interaction with a particular menu item (e.g., via clicking, touching, etc., the menu item), user device 210 may process, store, and/or provide information associated with the particular menu item. For example, user device 210 may apply an option and/or may execute a command corresponding to the selected menu item.

The menu may include hierarchical menu items, in some implementations. For example, selection of a parent menu item may cause one or more child menu items, that depend on the parent menu item, to be presented via an interface of user device 210. The hierarchy of menu items may include multiple levels, with menu items at a lower level (e.g., a child level) depending on menu items at a higher level (e.g., a parent level). For example, a sports section of a news application may include a hockey section, a baseball section, a football section, etc.

User device 210 may determine the menu information by requesting and/or receiving the menu information (e.g., from a software application, from server device 220, etc.), in some implementations. Additionally, or alternatively, user device 220 may determine the menu information by examining metadata and/or code (e.g., program code, source code, Extensible Markup Language (XML) code, HyperText Markup Language (HTML) code, etc.) of a software application associated with the menu information (e.g., a software application that uses the menu information to present menu items on a user interface), and/or by extracting the hierarchical menu items from the metadata and/or the code.

In some implementations, user device 210 may determine the menu information based on input identifying a keyword, a hash tag, or the like. For example, a user may input a keyword that the user desires to appear as a menu item on a menu presented by a menu application executing on user device 210. Additionally, or alternatively, user device 210 may determine the menu information by obtaining (e.g., from server device 220) information that identifies keywords, hash tags, etc. that are trending (e.g., have been used in a threshold quantity of searches, posts, etc. over a particular time period, have been read, selected, and/or provided for display a threshold quantity of times).

As further shown in FIG. 4, process 400 may include receiving configuration information that controls a manner in which the hierarchical menu items are provided for display (block 430). For example, user device 210 may receive input (e.g., from a user and/or from another device) that identifies the configuration information. The configuration information may control a manner in which the hierarchical menu items are provided for display on user device 210.

In some implementations, the configuration information may control a position of a menu, that includes the hierarchical menu items, on a display of user device 210. For example, the menu may be displayed at the top of the display, at the bottom of the display, along the left side of the display, along the right side of the display, etc. Additionally, or alternatively, the configuration information may control an orientation of the menu. For example, the menu may be displayed horizontally, vertically, diagonally, etc.

The configuration information may control whether the menu scrolls across the display of user device 210, in some implementations. For example, the menu may scroll across the display, or may remain stationary on the display. Additionally, or alternatively, the configuration information may control a speed at which menu information (e.g., hierarchical menu items) scrolls across the display, a direction of the scrolling (e.g., right, left, up, down, etc.), etc.

The configuration information may control when the menu is provided on the display of user device 210, in some implementations. For example, user device 210 may be configured to display the menu when a first application (e.g., a news application) is executing and/or being provided for display on user device 210 (e.g., in the foreground, as opposed to executing in the background), and to prevent the menu from being displayed when a second application (e.g., a word processing application, a video application, a movie application, etc.) is executing and/or being provided for display on user device 210.

Additionally, or alternatively, the configuration information may identify a particular user interaction that causes the menu to be provided for display. For example, the menu may be provided for display based on a user performing a particular gesture, such as single-tapping (e.g., at a particular position on a display of user device 210), a double-tapping (e.g., at a particular display location), pressing and holding (e.g., for a particular amount of time), etc.

Additionally, or alternatively, the configuration information may control an amount of time that the menu is provided for display. For example, user device 210 may display the menu for a particular period of time. When the particular period of time has lapsed (e.g., without the user interacting with the menu), user device 210 may hide the menu, may cause the menu to fade out, etc. User device 210 may show the menu, cause the menu to fade in, etc., based on detecting a user interaction with an input mechanism that causes the menu to be provided (e.g., double-tapping the display, interacting with a particular location on the display, etc.).

The configuration information may control a degree of transparency of the menu, in some implementations. For example, the menu may be overlaid on top of other information provided on the display of user device 210 (e.g., on top of information provided for display by another application). The menu may be provided transparently, so that the information provided behind the menu is partially visible.

The configuration information may control a label and/or an icon provided in association with a menu item, in some implementations. For example, user device 210 may show or hide labels (e.g., textual labels), may show or hide icons, may control a display characteristic of a label and/or icon (e.g., displayed text, an icon image, a color, a size, etc.), or the like, based on the configuration information.

In some implementations, the configuration information may control which menu items are provided for display. For example, a user may select menu items to show, menu items to hide, a hierarchical level of menu items to show and/or hide (e.g., show a top-level, show a sub-level of the top-level, etc.), or the like. Additionally, or alternatively, the configuration information may control a manner in which different hierarchical levels are represented on the display. For example, different hierarchical levels may be provided using different colors, different shapes, different sizes, different icons, etc. As an example, a higher-level menu item may be displayed larger than a lower-level menu item.

In some implementations, the configuration information may control a display characteristic of a menu item (e.g., a size, a color, a transparency level, whether an item is shown or hidden, or other characteristics discussed herein) based on information to which the menu item points and/or information that is linked to the menu item. For example, the menu item may point to a news article (e.g., the news article may be displayed when the menu item is selected). User device 210 may control a display characteristic of the menu item based on a size of the news article (e.g., a quantity of words, an amount of memory space required to store the news article, etc.), based on whether the news article has been read or unread by a user of user device 210 (e.g., whether the menu item has previously been selected by the user and/or provided for display on user device 210), based on a quantity of users (e.g., associated with one or more user devices 210) that have selected the news article (e.g., that have read the news article, such as within a particular time period), based on a quantity of users that have comments on the news article, based on a trend associated with the news article, etc. As another example, user device 210 may control a display characteristic of the menu item based on a quantity of news articles to which the menu item points (e.g., when the menu item points to a section of news that includes multiple articles).

As further shown in FIG. 4, process 400 may include providing the hierarchical menu items for display concurrently, via a menu overlaid on the other application, based on the configuration information (block 440). For example, user device 210 may provide the menu for display, and may overlay the menu on the other application (e.g., to which the menu information relates). As an example, user device 210 may overlay the menu of top of content, such as a news article, provided for display by the other application. User device 210 may provide different levels of the hierarchy for display concurrently, such that the user does not have to interact with a parent menu item to view child menu items of the parent menu item. User device 210 may provide the menu and/or the hierarchical menu items for display based on configuration information, as described above in connection with block 430.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
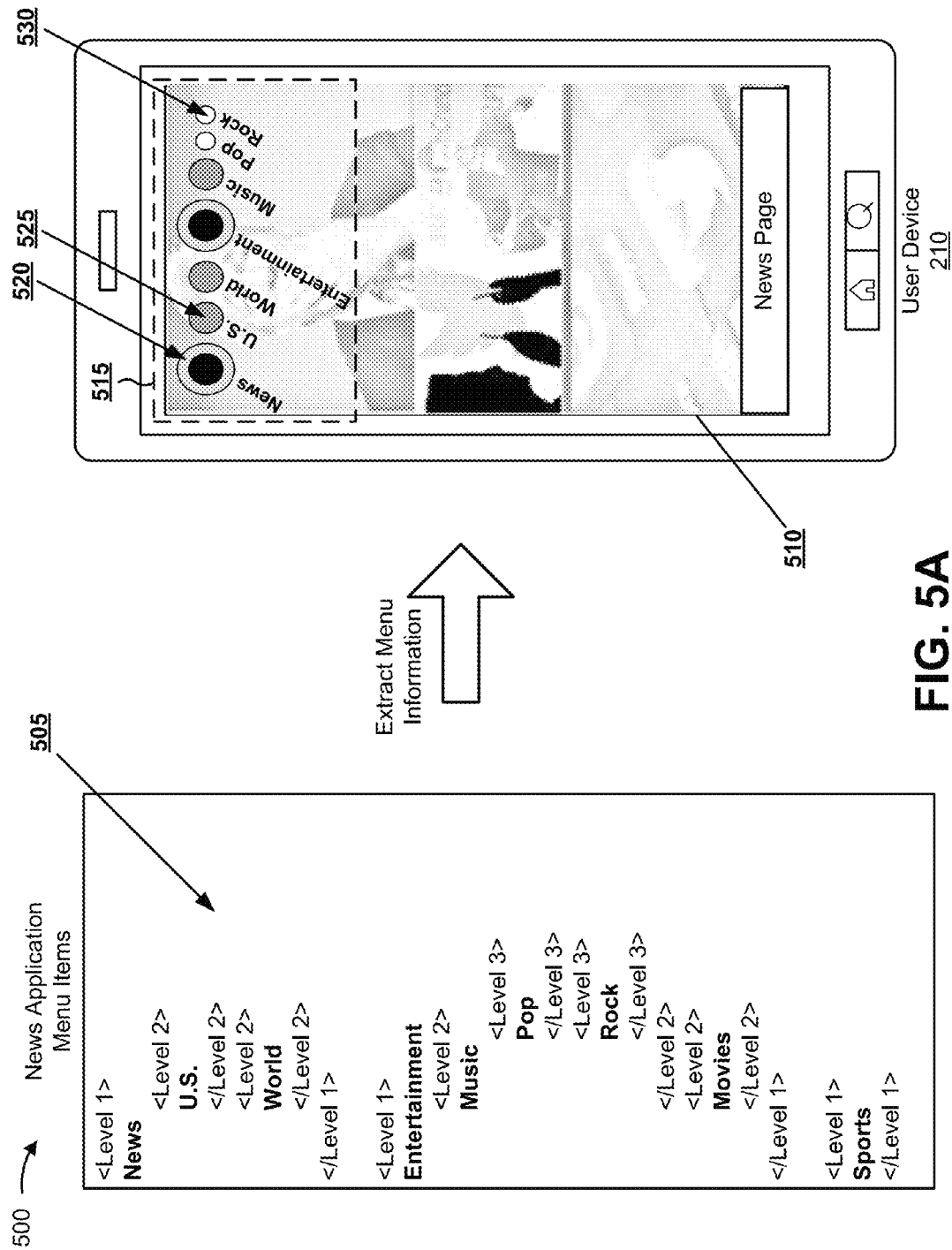
FIGS. 5A-5C are diagrams of an example implementation relating to the example process shown in FIG. 4.
Figure 5B:
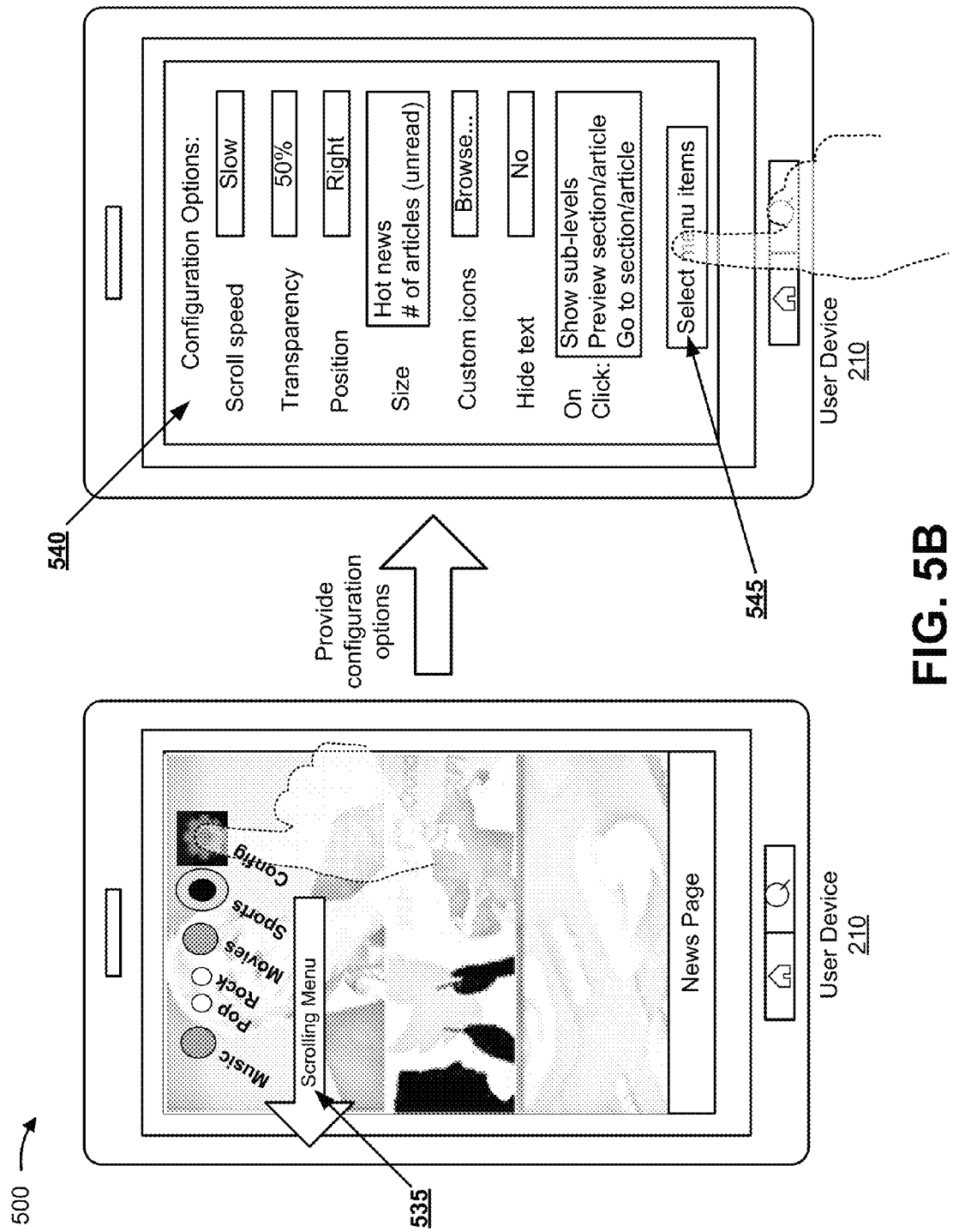
Figure 5C:
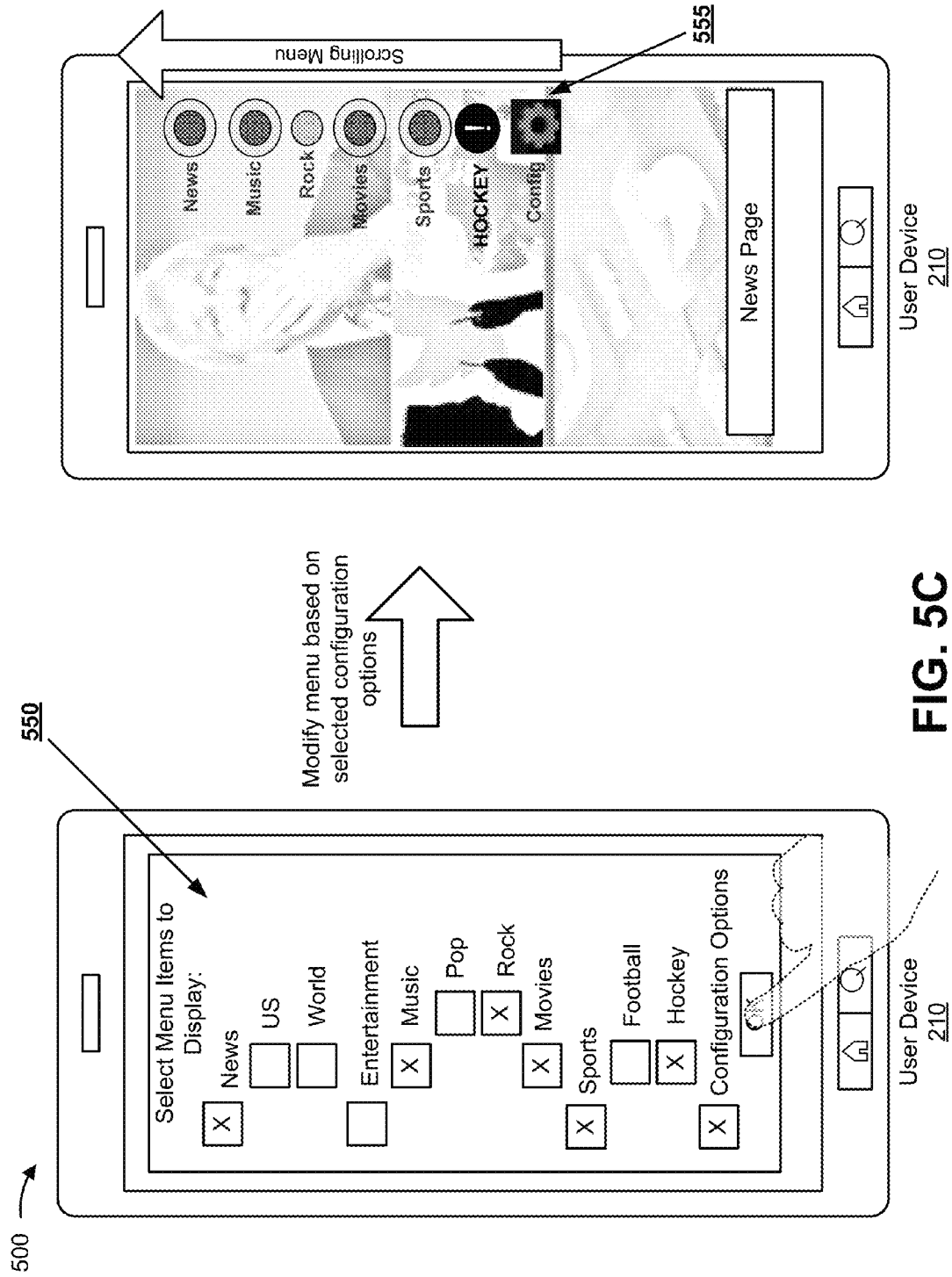

FIGS. 5A-5C are diagrams of an example implementation 500 relating to example process 400 shown in FIG. 4. FIGS. 5A-5C show an example of providing a menu of hierarchical menu items based on menu information and configuration information.

As shown in FIG. 5A, and by reference number 505, assume that a news application, stored by user device 210, includes XML code that identifies hierarchical menu items. As shown, assume that the XML code identifies three first-level (e.g., top-level) menu items, shown as News, Entertainment, and Sports. As further shown, assume that the XML code identifies four second-level menu items. Assume that U.S. and World are sub-level menu items of the News menu item, and that Music and Movies are sub-level menu items of the Entertainment menu item. Finally, assume that the XML code identifies two third-level menu items. Assume that Pop and Rock are sub-level menu items of the Music menu item. Assume that a menu application extracts the menu items from the XML code.

As shown by reference number 510, assume that user device 210 provides content, associated with the news application, for display. As shown by reference number 515, assume that user device 210 also provides the menu application for display, with the menu application being overlaid on the news application. The menu application provides the hierarchical menu items, extracted from the XML code, for display on user device 210.

As shown, the menu application provides menu items, associated with different levels of the hierarchy, in a different manner. For example, as shown by reference number 520, the top-level menu items of News and Entertainment are represented as ovals that are larger in size and different in color than representations of sub-level menu items of the top-level menu items. As shown by reference number 525, the second-level menu items of U.S., World, and Music are represented as dots that are smaller in size and different in color than representations of top-level menu items, and that are larger in size and different in color than representations of third-level menu items. As shown by reference number 530, the third-level (e.g., bottom-level) menu items of Pop and Rock are represented as dots that are smaller in size and different in color than representations of the second-level menu items.

As further shown, the menu application provides the menu items in an order determined based on the hierarchy. For example, assume that the displayed menu scrolls from right to left. Further assume that the News menu item appears first, followed by the U.S. and World menu items, which are sub-level menu items of the News menu item. Similarly, the Entertainment menu item appears next, followed by the Music second-level menu item, which is a sub-level menu item of the Entertainment menu item. The Music menu item is followed by the Pop and Rock third-level menu items, which are sub-level menu items of the Music menu item. In this way, the menu application may provide a representation of the hierarchy of menu items. Assume that the Movies and Sports menu items are not initially provided for display because these menu items do not fit horizontally on the display of user device 210 when the other menu items shown in FIG. 5A are provided on the display of user device 210

As shown in FIG. 5B, and by reference number 535, assume that the menu scrolls to the left to reveal the Movies menu item, the Sports menu item, and a Configuration Options menu item. Assume that a user interacts with the Configuration Options menu item, which causes user device 210 to provide a configuration options interface for display, as shown by reference number 540.

As shown, assume that the configuration options interface permits the user to input configuration options to control a scroll speed of the menu, to control a transparency level of the menu, to control a position of the menu on the display, to control an option for adjusting the size of menu items (e.g., based on "hot" news that adjusts a size of a menu item based on the number of users that have read a news article linked to the menu item, based on a quantity of unread articles associated with a news section linked to the menu item, etc.), to control a manner in which icons that represent menu items are provided for display (e.g., to select an image for an icon), to control whether text labels for menu items are shown or hidden, to control a command that is executed by user device 210 when a menu item is selected (e.g., to display sub-levels of a selected menu item, to display a preview of a news section and/or article, to display the full news section and/or article, etc.), and to control which menu items are provided for display.

Assume that the user sets a scroll speed of the menu to "Slow," sets a transparency level of the menu to 50 percent, sets a position of the menu to the right of the display, selects to display menu items associated with hot news larger than other menu items not associated with hot news, sets an option to use default icons, sets an option to show text labels, sets an option to show sub-levels on a single-click (and/or single-tap), and sets an option to display an article on a double-click (and/or a double-tap). As shown by reference number 545, assume that the user interacts with a "Select Menu Items" button.

As shown in FIG. 5C, and by reference number 550, assume that user interaction with the "Select Menu Items" button causes user device 210 to provide a user interface that permits the user to select menu items to be shown or hidden. For example, assume that the user selects to show the News, Music, Rock, Movies, Sports, Hockey, and Configuration Options menu items, and selects to hide the U.S., World, Entertainment, Pop, and Football menu items. Assume that the user finishes inputting configuration options, and that user device 210 modifies a manner in which the menu and/or menu items are provided for display, as shown by reference number 555.

As shown, based on the configuration options, user device 210 modifies a position of the menu so that the menu appears on the right-hand side of the display, modifies a transparency of the menu to make the menu more transparent, and modifies a scroll speed of the menu to a slow scroll speed. Furthermore, user device 210 provides a custom icon, for the hockey menu item, that is larger in size than a default size for the hockey menu item. Furthermore, user device 210 modifies the menu items that are displayed based on the selected menu items (e.g., News, Music, Rock, Movies, Sports, Hockey, and Configuration Options). Finally, because the Entertainment menu item has not been selected, user device 210 modifies an icon of the Music menu item to make the Music menu item appear as a top-level menu item, and to make the Rock sub-level menu item appear as a second-level menu item.

As indicated above, FIGS. 5A-5C are provided merely as an example. Other examples are possible and may differ from what was described with regard to FIGS. 5A-5C.

Figure 6:
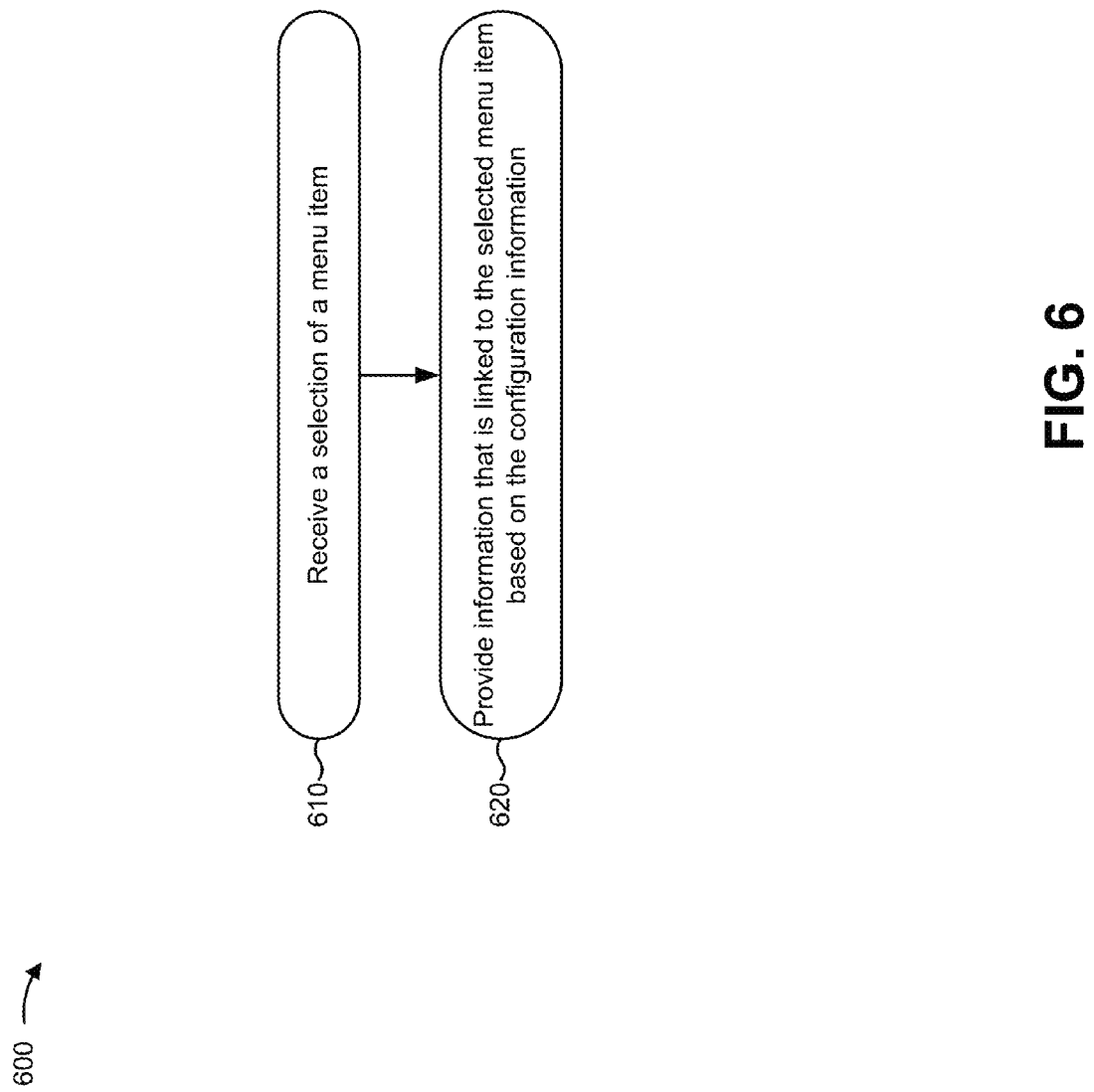
FIG. 6 is a flow chart of an example process for providing information based on an interaction with a menu item.

FIG. 6 is a flow chart of an example process 600 for providing information based on an interaction with a menu item. In some implementations, one or more process blocks of FIG. 6 may be performed by user device 210. Additionally, or alternatively, one or more process blocks of FIG. 6 may be performed by another device or a group of devices separate from or including user device 210, such as server device 220.

As shown in FIG. 6, process 600 may include receiving a selection of a menu item (block 610), and providing information that is linked to the selected menu item based on the configuration information (block 620). For example, user device 210 may receive a selection, by a user, of a representation of a menu item provided for display on user device 210. In some implementations, user device 210 may receive the selection by detecting an interaction with the menu item, such as a click, a tap, a gesture, etc. Based on receiving the selection of the menu item, user device 210 may perform an action associated with the menu item, such as by providing information that is linked to the menu item. User device 210 may determine the action and/or the information to provide based on configuration information. Additionally, or alternatively, user device 210 may determine the action and/or the information to provide based on a type of user interaction with a menu item. For example, different types of user interactions (e.g., single-tapping, double-tapping, tapping and holding, etc.) may cause user device 210 to perform different actions and/or provide different information for display.

For example, the configuration information may indicate that user device 210 is to provide sub-level menu items linked to a selected menu item. In this case, when a user selects a menu item, user device 210 may provide sub-level menu items, that depend from the selected menu item, for display. For example, when the user selects a News menu item, user device 210 may provide, in the menu, a U.S. menu item and a World menu item.

As another example, the configuration information may indicate that user device 210 is to provide a preview of information linked to the selected menu item. In this case, when the user selects a menu item, user device 210 may provide a preview of an article, a news section, etc., in a section (e.g., a window) that is smaller than a size of a news application on which the menu application is overlaid. User device 210 may overlay the preview on the news application (e.g., using a same transparency, relative size, and/or other display characteristic associated with the menu and/or the selected menu item). In some implementations, the user may select the menu item again, and/or may select the preview, to cause user device 210 to provide the linked information in the news application (e.g., using a full-sized window rather than a preview window).

As another example, the configuration information may indicate that user device 210 is to provide the information linked to the selected menu item in a manner that the information would normally be provided by the news application. For example, the user may select a menu item that corresponds to a news section, and user device 210 may provide the news section in a full-sized window of the news application. As another example, the user may select a menu item that corresponds to a news article, and user device 210 may provide the news article in a full-sized window of the news application.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
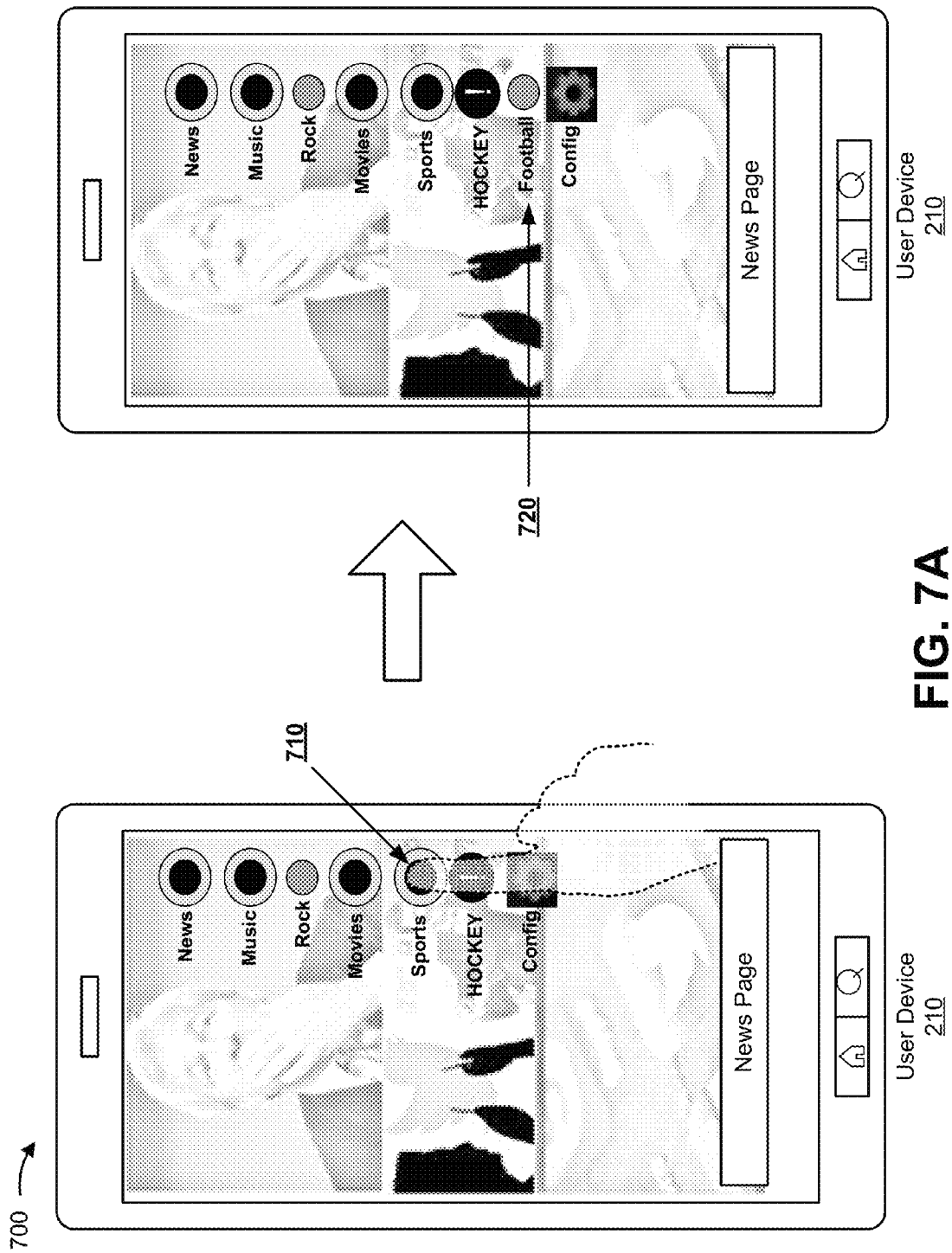
FIGS. 7A and 7B are diagrams of an example implementation relating to the example process shown in FIG. 6.
Figure 7B:
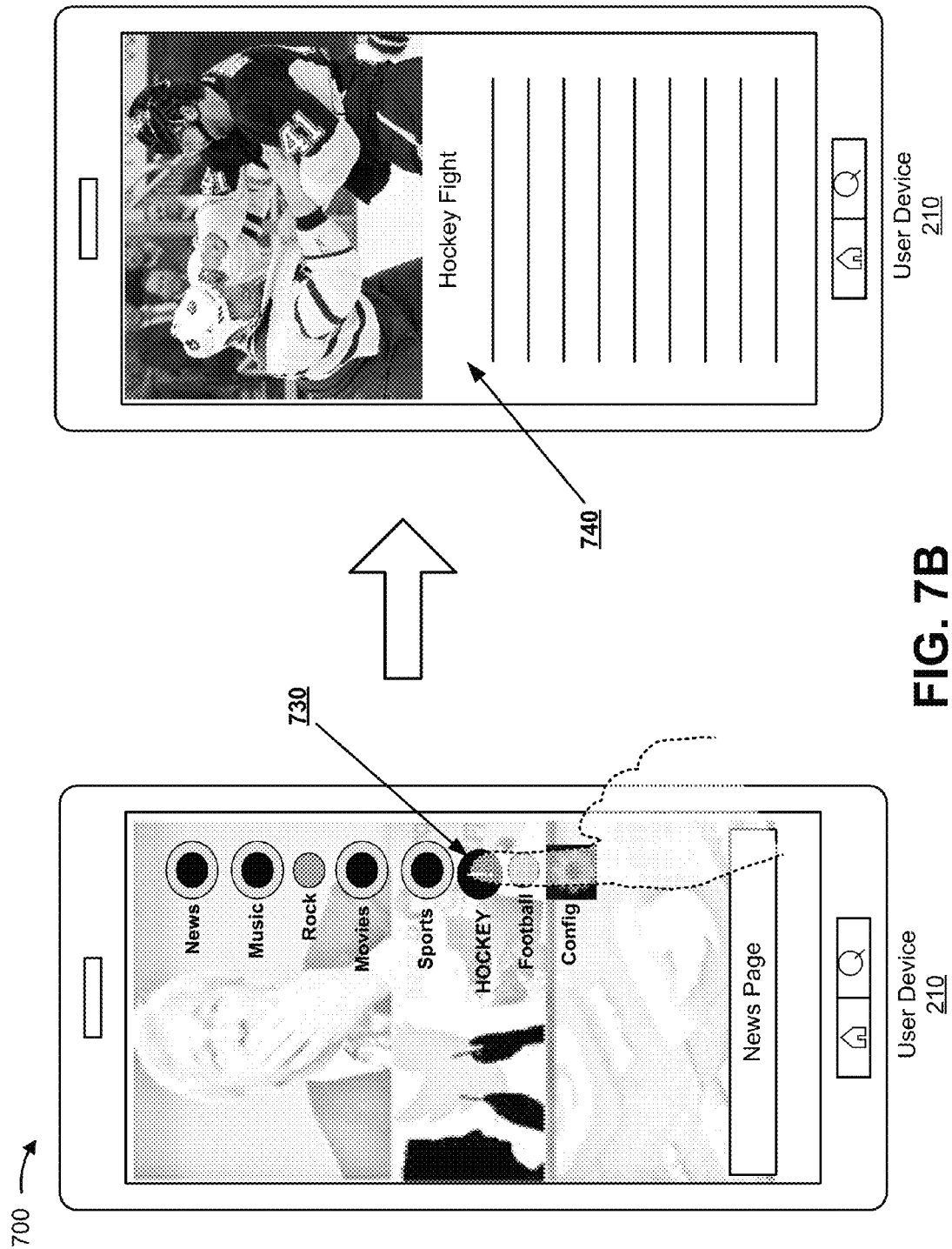

FIGS. 7A and 7B are diagrams of an example implementation 700 relating to example process 600 shown in FIG. 6. FIGS. 7A and 7B show an example of providing information based on an interaction with a menu item. For the purpose of FIGS. 7A and 7B, assume that the user has selected the configuration options as described herein in connection with FIGS. 5A-5C.

As shown in FIG. 7A, and by reference number 710, assume that the user single-taps on the Sports menu item, which is associated with a Hockey sub-level menu item. This user interaction (e.g., a single-tap) causes user device 210 to display other sub-level menu items (e.g., other than the Hockey menu item), that depend on the Sports menu item. For example, as shown by reference number 720, user device 210 displays a Football menu item.

As shown in FIG. 7B, and by reference number 730, assume that the user double-taps the Hockey menu item. As shown by reference number 740, this user interaction (e.g., a double-tap) with the Hockey menu item causes a hockey news story to be displayed. In this way, a user may control what happens when different levels of the menu item hierarchy are selected (e.g., display sub-levels of higher-level menu items and display news stories for bottom-level menu items, display sections and/or articles for all selected menu items, etc.) and/or when different types of user interactions are detected.

As indicated above, FIGS. 7A and 7B are provided merely as an example. Other examples are possible and may differ from what was described with regard to FIGS. 7A and 7B.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, a "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
   one or more processors to:
   execute a menu application that provides menu information, associated with another application, for display;
   execute the other application to cause first information, associated with the other application, to be provided for display;
   extract the menu information from second information, associated with the other application, based on executing the menu application, the menu information identifying a plurality of hierarchical menu items associated with a first menu of the other application,
the plurality of hierarchical menu items including at least two hierarchical menu items associated with different levels of a menu hierarchy;
receive configuration information that controls a manner in which the at least two hierarchical menu items are provided for display,
the configuration information indicating that the at least two hierarchical menu items are to be provided for display when the other application is being provided for display,
the configuration information indicating that the at least two hierarchical menu items are not to be provided for display when at least one other application is being provided for display;
determine that the other application is being provided for display; and
provide the at least two hierarchical menu items for display concurrently, via a second menu overlaid on the first information associated with the other application, based on the configuration information and based on determining that the other application is being provided for display.

2. The device of claim 1, where the one or more processors, when extracting the menu information from the second information, are to:
extract the menu information from metadata or code associated with the other application.

3. The device of claim 1, where the one or more processors are further to:
provide, for display, information that identifies the plurality of hierarchical menu items;
receive a selection of a set of hierarchical menu items included in the plurality of hierarchical menu items; and
where the one or more processors, when providing the at least two hierarchical menu items for display, are to:
provide the selected set of hierarchical menu items for display.

4. The device of claim 1, where the one or more processors, when providing the at least two hierarchical menu items for display, are to:
scroll the at least two hierarchical menu items across an interface of the other application.

5. The device of claim 4, where the one or more processors, when receiving the configuration information, are to:
receive information that identifies a scroll speed associated with the second menu; and
where the one or more processors, when scrolling the at least two hierarchical menu items, are to:
scroll the at least two hierarchical menu items based on the scroll speed.

6. The device of claim 1, where the one or more processors, when providing the at least two hierarchical menu items, are to:
provide a first hierarchical menu item, of the at least two hierarchical menu items and associated with a first level of the menu hierarchy, with a first visual characteristic; and
provide a second hierarchical menu item, of the at least two hierarchical menu items and associated with a second level of the menu hierarchy, with a second visual characteristic,
the second level being different from the first level, and the second visual characteristic being different from the first visual characteristic.

7. The device of claim 1, where the one or more processors, when receiving the configuration information, are to:
determine a first set of applications for which the second menu is to be shown;
determine a second set of applications for which the second menu is to be hidden;
where the one or more processors, when providing the at least two hierarchical menu items for display, are to:
determine that the other application is included in the first set of applications; and
provide the at least two hierarchical menu items for display based on determining that the other application is included in the first set of applications.

8. A non-transitory computer-readable medium storing instructions, the instructions comprising:
one or more instructions that, when executed by one or more processors, cause the one or more processors to:
extract menu information associated with a first application,
the menu information identifying a plurality of hierarchical menu items corresponding to at least two levels of a menu hierarchy associated with a first menu of the first application;
receive configuration information that controls a manner in which the plurality of hierarchical menu items are to be provided for display,
the configuration information indicating that the plurality of hierarchical menu items are to be provided for display when the first application is being executed;
execute the first application to cause first information, associated with the first application, to be provided for display;
execute a second application that provides the plurality of hierarchical menu items for display,
the second application being different from the first application;
determine that the first application is being executed; and
provide the plurality of hierarchical menu items for display concurrently, via a second menu overlaid on the first information associated with the first application, based on the configuration information and further based on determining that the first application is being executed.

9. The non-transitory computer-readable medium of claim 8, where the one or more instructions, when executed by the one or more processors, further cause the one or more processors to:
detect an interaction with a menu item of the plurality of hierarchical menu items;
determine linked information, linked to the menu item, to be provided based on the configuration information; and
provide the linked information for display via the first application based on detecting the interaction.

10. The non-transitory computer-readable medium of claim 8, where the one or more instructions, when executed by the one or more processors, further cause the one or more processors to:
determine a display characteristic for displaying a menu item, of the plurality of hierarchical menu items, based on information to which the menu item points; and
where the one or more instructions, that cause the one or more processors to provide the plurality of hierarchical menu items for display, cause the one or more processors to:

provide the menu item for display based on the display characteristic.

11. The non-transitory computer-readable medium of claim 8, where the one or more instructions, when executed by the one or more processors, further cause the one or more processors to:
 determine a display characteristic for displaying a menu item, of the plurality of hierarchical menu items, based on an amount of information to which the menu item points; and
 where the one or more instructions, that cause the one or more processors to provide the plurality of hierarchical menu items for display, cause the one or more processors to:
  provide the menu item for display based on the display characteristic.

12. The non-transitory computer-readable medium of claim 8, where the one or more instructions, when executed by the one or more processors, further cause the one or more processors to:
 provide information that identifies a set of hierarchical menu items; and
 receive a selection of the plurality of hierarchical menu items included in the set of hierarchical menu items,
  the plurality of hierarchical menu items being a subset of the set of hierarchical menu items.

13. The non-transitory computer-readable medium of claim 8, where the one or more instructions, that cause the one or more processors to provide the plurality of hierarchical menu items for display, cause the one or more processors to:
 scroll the plurality of hierarchical menu items across the first information associated with the first application.

14. The non-transitory computer-readable medium of claim 13, where the one or more instructions, that cause the one or more processors to receive the configuration information, cause the one or more processors to:
 receive information that identifies a scroll speed associated with the second menu; and
 where the one or more instructions, that cause the one or more processors to scroll the plurality of hierarchical menu items, cause the one or more processors to:
  scroll the plurality of hierarchical menu items across the first information, associated with the first application, based on a speed identified by the scroll speed.

15. A method, comprising:
 executing, by a device, a first application to cause application information, associated with the first application, to be provided for display on the device;
 executing, by the device, a second application that provides menu information, associated with the first application, for display on the device,
  the second application being different from the first application;
 extracting, by the device and based on executing the second application, the menu information from stored information associated with the first application,
  the menu information identifying a plurality of hierarchical menu items associated with at least two different levels of a menu hierarchy identified in the stored information associated with the first application;
 receiving, by the device, configuration information that controls a manner in which a subset of hierarchical menu items, included in the plurality of hierarchical menu items, are provided for display on the device,
  the configuration information indicating that the subset of hierarchical menu items are to be provided for display when the application information, associated with the first application, is being provided for display,
  the configuration information indicating that the subset of hierarchical menu items are not to be provided for display when other application information, associated with a third application, is being provided for display,
   the third application being different from the first application and the second application;
 determining, by the device, that the application information, associated with the first application, is being provided for display; and
 providing, by the device, the subset of hierarchical menu items for display based on the configuration information and based on determining that the application information, associated with the first application, is being provided for display,
  the subset of hierarchical menu items being provided for display via a menu overlaid on the application information associated with the first application.

16. The method of claim 15, further comprising:
 receiving a selection of a menu item of the subset of hierarchical menu items;
 determining linked information, linked to the selected menu item, to be provided based on the configuration information; and
 providing the linked information for display via the first application based on receiving the selection of the menu item.

17. The method of claim 15, where the stored information includes metadata or code; and
 where extracting the menu information comprises:
  extracting the menu information from the metadata or the code.

18. The method of claim 15, where receiving the configuration information comprises:
 receiving information that identifies a first display characteristic for displaying a first menu item of the plurality of hierarchical menu items,
  the first menu item being associated with a first level of the menu hierarchy;
 receiving information that identifies a second display characteristic for displaying a second menu item of the plurality of hierarchical menu items,
  the second display characteristic being different from the first display characteristic,
  the second menu item being associated with a second level of the menu hierarchy,
  the second level being different from the first level;
 where providing the subset of hierarchical menu items comprises:
  providing the first menu item based on the first display characteristic; and
  providing the second menu item based on the second display characteristic.

19. The method of claim 15, where providing the subset of hierarchical menu items for display comprises:
 providing a visual indication of the menu hierarchy.

20. The method of claim 15, further comprising:
 determining a display characteristic for displaying a menu item, of the subset of hierarchical menu items, based on a trend associated with information to which the menu item points; and
 where providing the subset of hierarchical menu items for display comprises:

providing the menu item for display with a different visual characteristic than other menu items, of the subset of menu items, based on the display characteristic.

* * * * *